W. H. PUHL.
PAN CLEANING AND GREASING MACHINE.
APPLICATION FILED MAY 10, 1920.

1,363,013.

Patented Dec. 21, 1920.
3 SHEETS—SHEET 1.

Witness
Geo. L. Laurence

Inventor
William H. Puhl
By Chas. Q. Tillman
atty.

W. H. PUHL.
PAN CLEANING AND GREASING MACHINE.
APPLICATION FILED MAY 10, 1920.

1,363,013.

Patented Dec. 21, 1920.
3 SHEETS—SHEET 3.

Witness
Geo. L. Lawrence

Inventor
William H. Puhl
By Chas. C. Tillman
Atty.

UNITED STATES PATENT OFFICE.

WILLIAM H. PUHL, OF ZION, ILLINOIS.

PAN CLEANING AND GREASING MACHINE.

1,363,013. Specification of Letters Patent. Patented Dec. 21, 1920.

Application filed May 10, 1920. Serial No. 380,198.

*To all whom it may concern:*

Be it known that I, WILLIAM H. PUHL, a citizen of the United States, residing at Zion, in the county of Lake and State of Illinois, have invented certain new and useful Improvements in Pan Cleaning and Greasing Machines, of which the following is a specification.

This invention relates to improvements in machines employed for cleaning and greasing pans, and while it is more particularly intended for use in cleaning and greasing that type of pans used by bakers and confectioners for baking cookies, tea-biscuits, rolls, ginger snaps, cocoons and the like, and will be herein so shown and described, yet, it will be understood that is applicable for use in cleaning and greasing other kinds of baking pans, or pans used for cooking other articles of food, and for this reason I do not wish to be understood as limiting myself in its application or use to any class of pans or cooking utensils, but may employ it for any cleaning and greasing purposes for which it may be adapted.

The invention consists in certain peculiarities of the construction, novel arrangement, combination and operation of the various parts thereof, as will be hereinafter more fully set forth and specifically claimed.

The principal object of the invention is to provide a pan cleaning and greasing machine of the above mentioned general character, which shall be simple and inexpensive in construction, strong, durable and efficient in operation, with its parts so made and arranged as to be readily assembled and easily accessible for adjustment and the replacement or repair of parts when required.

A further object is to furnish a machine, by means of certain parts of which, the pans will be thoroughly cleaned prior to being greased by a grease applicator or greasing element, simultaneously operable with the cleaning instrumentalities.

A further object is the provision of simple and effective means for the vertical adjustment of the grease applicator and one of the cleaning elements and for regulating the quantity of grease supplied to the pans.

Various other objects and advantages of the invention will be disclosed in the following description and explanation.

In the accompanying drawings, which serve to illustrate an embodiment of the invention—

Like numerals of reference refer to corresponding parts throughout the different views of the drawings.

Figures 1, 6:
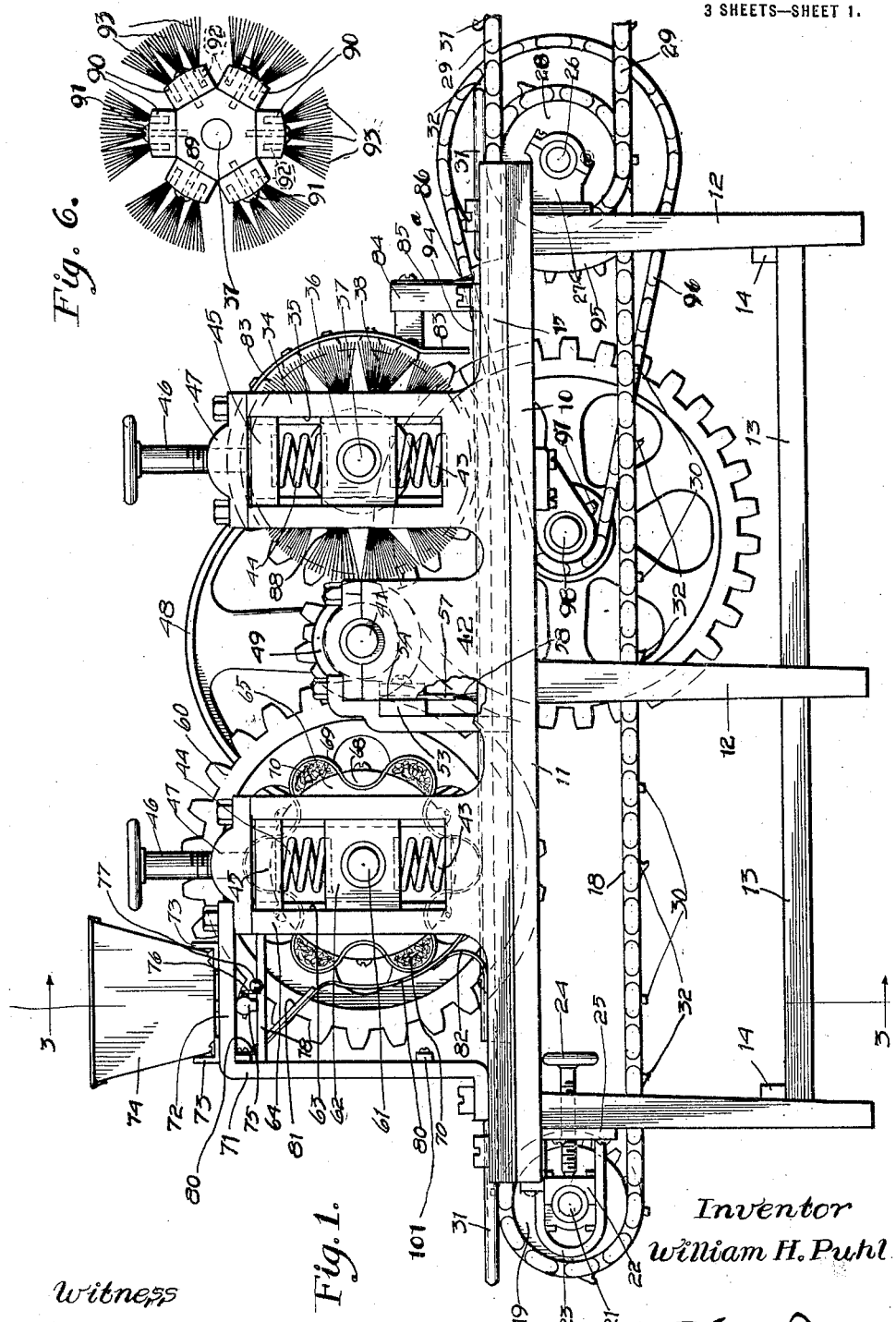
Figure 1 is a view in side elevation of the machine showing part of a pan delivery conveyer connected thereto at its pan receiving end.
Fig. 6 is an end view of a modified form of the rotary cleaning brush.

The main or supporting frame of the machine is designated as a whole by the reference numeral 10 and consists of a horizontally disposed floor 11 substantially rectangular in shape and supported by means of legs 12, which latter may be secured together by longitudinal and transverse braces 13 and 14 respectively. Mounted on the floor at each side edge thereof is a side rail 15 each of which is firmly fastened to the floor 11 of the main frame and each of which is equipped with suitable uprights to form bearings and guideways for certain parts of the machine, as will be presently explained.

Figure 2:
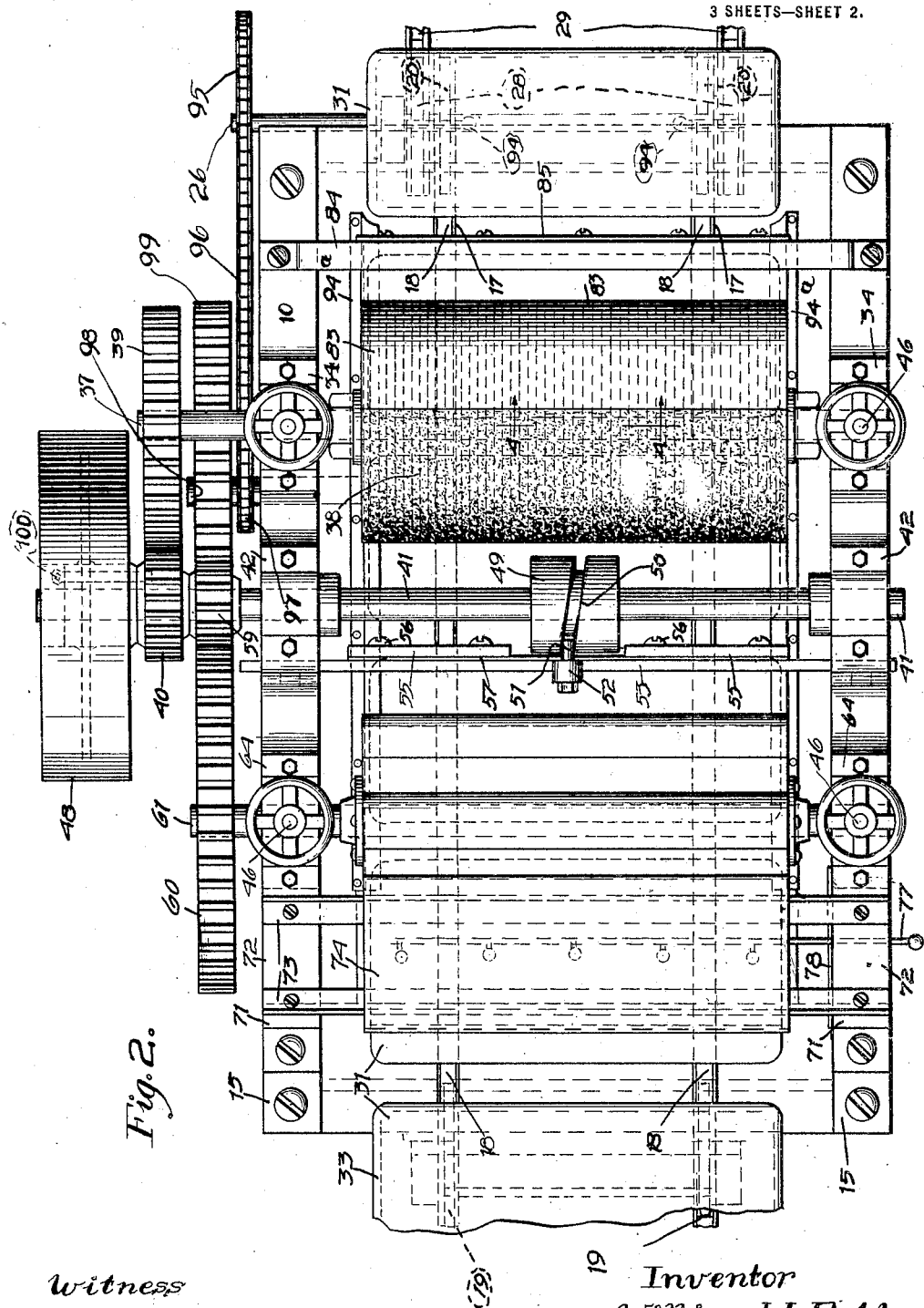
Fig. 2 is a plan view.
Figure 3:
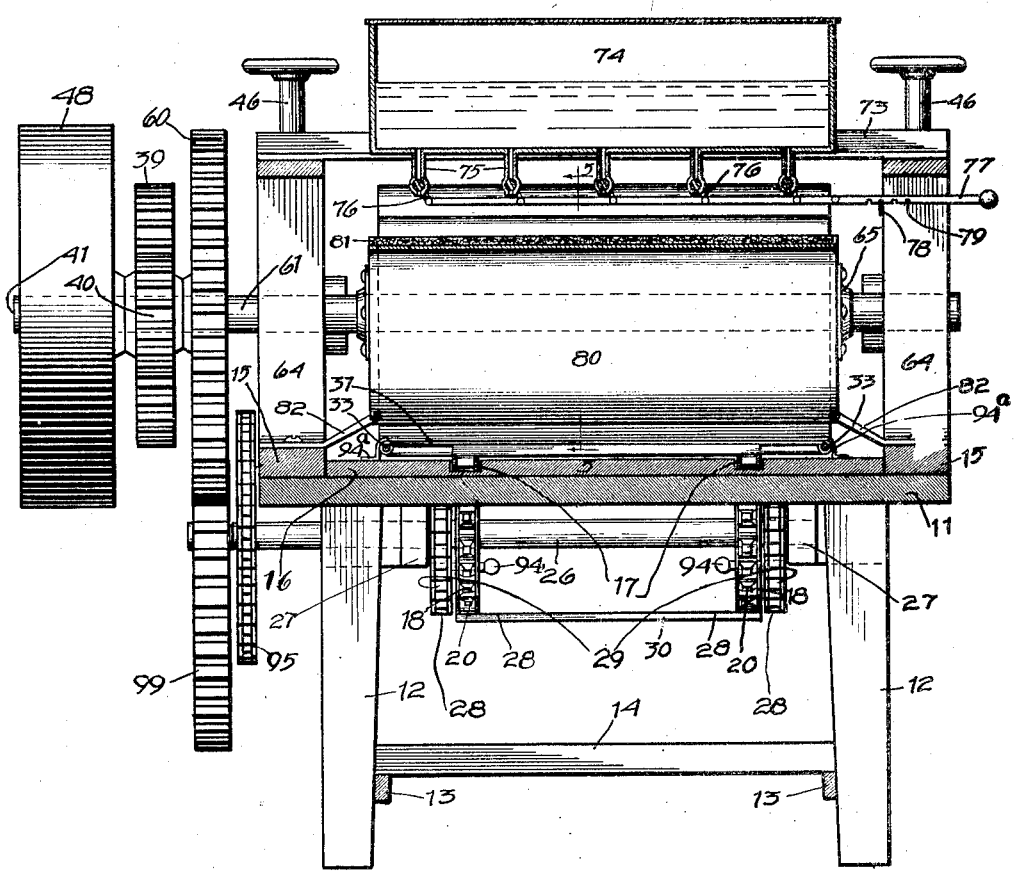
Fig. 3 is a cross sectional view taken on line 3—3 of Fig. 1 looking in the direction indicated by the arrows.

Horizontally located on the upper surface of the floor 11 between the side rails thereof is a supplemental floor or plate 16 which extends from one end of the frame 10 to the other, and is provided in its upper surface with a pair of longitudinally extended and spaced apart guides 17, see Fig. 3, for the operation of the upper part of an endless conveyer, which consists of a pair of endless members 18 by preference in the form of sprocket chains. As shown in Figs. 1 to 3 inclusive of the drawings, the members 18 or sprocket chains are located in parallelism with one another, and each passes over a pair of sprocket wheels 19 and 20 the former of which are rigidly mounted on a shaft 21 journaled near its ends in boxes 22 mounted for sliding movement longitudinally in guide brackets 23 one of which is mounted on each side of the discharging end of the supporting frame, as will be readily understood by reference to Fig. 1 of the drawings.

The journal boxes 22 in which the shaft 21 is journaled may be adjusted by means of a screw 24 suitably connected at one of their ends to said boxes and horizontally mounted on a transversely extended bar 25 on the main frame. The sprocket wheels 20 at the other end of the main frame are rigidly mounted on a shaft 26 which is journaled near its ends in suitable hangers 27 suitably mounted on the supporting frame near the side edges of the floor 11 of the frame.

By the above described arrangement it is obvious that as the sprocket chains or members 18 extend around the sprocket wheels 19 and 20, any slackness in said chains or members can be taken up by properly adjusting the journal boxes 22 for the shaft 21 by means of the adjusting screws 24.

Loosely mounted on the shaft 26 near the outer surface of each of the sprocket wheels 20 is a sprocket wheel 28 over which pass endless belts or sprocket chains 29 which are located in parallelism, as shown in Figs. 2 and 3 of the drawings, and constitute a delivery conveyer, or a part thereof, for pans, which are thereby delivered to the conveyer, of the machine comprising the sprocket chains or members 18 which are transversely united on their outer surfaces by means of spaced slats 30 upon which the pans 31 will rest while being conveyed through the machine for treatment. The sprocket chains 29 of the delivery conveyer pass over other sprocket wheels not shown, which latter may be driven by any suitable means.

Each of the wheels 20 is provided with a clutch pin 94, see Fig. 3, which can be placed in engagement with suitable openings in the sprocket wheels 28 should it be desired to cause the feeding conveyer or members 18 to be operated through the instrumentality of the delivery conveyer.

Thus it will be understood that power from the delivery conveyer or the chains 29 will be transmitted through the sprocket wheels 28 and shaft 26 to the sprocket wheels 20 and thus cause the feeding conveyer or members 18 to move in the proper direction.

The sprocket chains 18 are provided on their outer surfaces with a series of hooks or spurs 32 which are extended in the direction of the movement of said chains and are for the purpose of engaging the edges of the pans 31 which pans, as shown in Figs. 2 and 3 of the drawings, are flat on their upper surfaces and are reinforced around their perimeters with wires 33 over which the edges of the pans are clamped, thus providing pans with flat and smooth upper surfaces on which the articles to be baked are placed.

Each of the side rails 15 is provided near its end adjacent to the delivery conveyer or that end adjacent to the shaft 26 with an upright 34 which is provided with a vertical guide-way 35 for the reception of a journal box 36 in which the shaft 37 of a rotary brush designated as a whole by the reference numeral 38 is journaled at its ends. This shaft has fixed thereon near one of its ends a gear 39 which meshes with a gear 40 fixed on a drive shaft 41 which is journaled in suitable bearings or upright pillow blocks 42 with which each of the side rails 15 is equipped near its upright 34.

The journal boxes 36 in the uprights 34 are mounted for vertical slidable movement in the guide-ways of said uprights and as will be understood by reference to Fig. 1 of the drawings, each of said boxes is supported by a spring 43 located between the floors of the guide-ways 35 and said boxes. By reference to said figure, it will also be seen and understood that each of the boxes 36 has resting on its upper portion one end of a spring 44 the other end of which engages a slidable block 45 mounted in the guide-ways of the uprights 34. These blocks 45 can be adjusted so as to regulate the tension of the springs 43 and 44 and so as to regulate the position of the rotary brush 38 relative to the pans 31 by means of adjusting screws 46 which are extended through suitable openings in the heads 47 secured to the uprights 34 and suitably engage said blocks.

Mounted on the driving shaft 41 adjacent the gear 40 thereon is a pulley 48 to which power from a suitable source (not shown) may be applied by means of a belt. This shaft has fixed thereon about midway between the side rails 15 a cylindrical enlargement 49 which is provided in its periphery with a cam groove 50 for the reception of a projection 51, horizontally mounted and extended from an arm 52 which is extended upwardly from the middle portion of a bar 53 which is located in parallelism with the shaft 21 and is located in suitable guideways 54 provided in the uprights or pillow blocks 42 of the main frame.

Secured to the reciprocatory bar 53 on its surface adjacent the rotary brush 38 by means of clamping bars 55 and screws 56 is a bar 57 which has depending therefrom bristles 58, see Fig. 1 of the drawings, which bristles extend at their lower ends in the path of the pans 31 as they are fed through the machine.

By this arrangement it is evident that in the rotation of the driving shaft 41 the brush carrying bar 53 will be reciprocated transversely with respect to the machine by reason of the cam 50 and the connections on said bar engaging said cam. Adjacent the gear 40 the driving shaft 41 has fixed thereon a gear 59 which meshes with a gear 60 fixed on a shaft 61 which is transversely journaled in vertically movable journal boxes 62 mounted in vertical guide-ways 63 in uprights 64 with which each of the side rails 15 is provided near the discharging end of the machine. The journal boxes 63 are supported and actuated by springs 43 and 44 the tension of which springs and the movements of the journal boxes 62 being controlled by means of adjusting screws 46 and movable blocks 45 in a similar manner and of like construction as those used in connection with the uprights 34 for the shaft of the rotary brush and above described.

Figure 5:
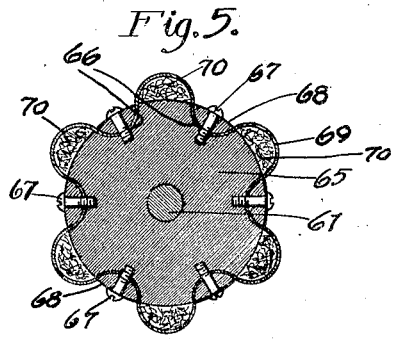
Fig. 5 is a cross-sectional view of the rotatable grease applicator or element.

Rigidly mounted on the shaft 61 is a drum 65 which is provided in its periphery with a series of spaced apart longitudinally extended grooves or depressions 66 in each of which is located and secured by means of screws 67 a clamping bar 68 which bars are employed for holding in position on the drum 65 a covering 69 of cloth or any suitable material which is interposed at intervals between the clamping bars 68 and the surfaces of the grooves 66 as will be clearly seen by reference to Fig. 5 of the drawings, in which view it will be observed that pads 70 of any suitable absorbent material are located longitudinally on the drum 65 between the grooves 66 therein and between the outwardly extended portions of the covering 69 and the periphery of the drum. By this arrangement it is evident that a grease applicator of simple and efficient construction is provided and it will be understood that the drum 65 equipped with a covering 69 and pads 70 will lie horizontally and transversely above the path traveled by the pans 31, yet so that the pads will contact with the upper surfaces of said pans in the rotation of the rotary drum 65 or grease applicator.

Extended upwardly from each of the side rails 15 near the discharging end of the machine is a bracket 71 each of which has at its upper portion a horizontal arm 72 extended toward the uprights 64 of the main frame.

Transversely mounted on the arms 72 are spaced parallel angle bars 73 which support a grease container or receptacle 74 which has leading downwardly from its floor a series of faucets or cocks 75 for the discharge of grease from the container. To the valve handles 76 of each of the cocks 75 is loosely connected an operating bar 77 which can be moved in the proper direction to open or close the cocks in which position the bar may be retained by means of a catch bar 78 mounted on one of the brackets 71 and one of the uprights 64 engaging spaced notches 79 in the operating bar as is clearly shown in Fig. 3 of the drawings.

Mounted at its upper end on the inner upper portion of the brackets 71 is a grease deflector 80 which extends crosswise of the machine and downwardly in an inclined position toward the receiving end of the machine to about the middle of said deflector and from thence downwardly toward the receiving end of the machine in a curved line near the outer surfaces of the pads 70 of the drum 65, all of which will be clearly seen and understood by reference to Fig. 1 of the drawings. The downwardly inclined portion of the deflector 80 is located some distance beneath the lower ends of the cocks 75 and is provided on its upper surface with an absorbent pad 81 to become saturated with grease as it is discharged from the container 74 through the cocks 75 and to hold the same against too free flow from said inclined portion of the deflector, but to allow it to ooze or flow slowly therefrom when it will be absorbed and distributed by the pads 70 and applied to the pans in the rotation of the drum 65 and in the movement of the pans.

The lower portion of the deflector 80 may be supported near each of its edges by means of a spring or arm 82 one of which is mounted on each of the side rails 15 and extended inwardly therefrom as is clearly shown in Figs. 1 and 3 of the drawings.

Transversely mounted above the rotary brush 38 and between said brush and the receiving end of the frame is a shield 83 which will prevent the particles removed by the cleaning elements and especially by the rotary brush 38 from the pans being scattered or thrown into the room.

Extended upwardly from the rails 15 and across the main frame near its receiving end is a bar 84 on which is secured another bar or strip 85 which has depending therefrom bristles 86 to contact with the upper surfaces of the pans and to afford the initial cleaning element therefor.

Figure 4:
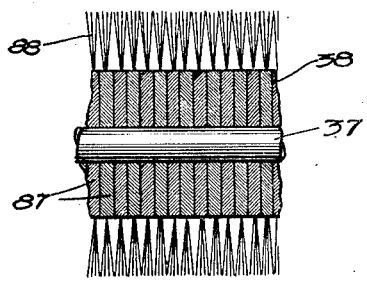
Fig. 4 is a central longitudinal sectional view of a portion of one form of a rotary brush used as one of the cleaning elements of the machine.

The rotary brush 38 may be of that construction shown in Fig. 4 or of the construction shown in Fig. 6 of the drawings. In the former construction the brush consists of a series of circular disks 87 mounted on the shaft 37 so as to turn therewith and against each other. Each of these disks is provided in its periphery at suitable points with radially disposed openings in which the inner ends of a bunch or group of bristles 88 are secured in any suitable manner, thus permitting their outer portions to spread or flare as shown in Figs. 1 and 4 of the drawings.

As before stated, instead of employing a rotary brush of the above described construction and that illustrated in Figs. 1 and 4, I may employ a brush of the construction shown in Fig. 6 which consists in mounting on the shaft 37 near each end thereof an angular shaped head 89 and connecting said heads by means of bars 90 secured to the heads by means of screws 91 which are extended through suitable openings in said bars and engage the heads 89 in their angular faces. In this construction each of the bars 90 is provided with a series of openings 92 in which one end of bunches of bristles 93 are secured in any suitable manner.

In this construction it is evident that should the bristles of any of the bars become dislocated, said bar can be readily removed for the insertion of new bristles in the openings therefor and easily replaced on the heads of the drum which is formed by said heads and bars.

Mounted on the shaft 26 near its end adjacent the driving pulley 48 is a sprocket wheel 95 over which passes a sprocket chain 96 which also engages a sprocket wheel 97 mounted on a shaft 98 transversely journaled in suitable bearings mounted on and depending from the main frame 10, which shaft is by preference located between vertical lines extended through the shafts 37 and 41 and above described. Mounted on the shaft 98 adjacent the gear 39 is a gear 99 which meshes with the gear 59 as is clearly shown in Fig. 2 of the drawings.

From the foregoing and by reference to the drawings it will be readily understood and clearly seen that, assuming the parts are in the positions shown in Figs. 1 and 2 of the drawings, and that the machine is set in operation by applying power to the driving shaft 41 through the instrumentality of a belt passing over the pulley 48 or otherwise, which pulley as shown is in clutch engagement with the gear 40 by means of a clutch pin 100, the members 18 of the feeding conveyer carrying the pans 31 will be caused to travel along the upper surface of the supplemental floor 16, which as well as the floor 11, may be slotted, or made of slats so as to permit crumbs and the like removed from the pans to pass therefrom. In this operation it is evident that the members 18 of the feeding conveyer will be guided at their side edges by means of the guide strips 94ª secured longitudinally on the supplemental floor.

In the progress of the pans, it is apparent that the bristles or brush 86 near the receiving end of the machine will act to clean the pans of particles or material that may cling thereto and that in the further progress of the pans the rotary brush, whether of the form shown in Fig. 4 or that shown in Fig. 6, will act to more thoroughly or effectually clean the pans of any material adhering thereto which may have passed the brush 86. As the pans still progress, they will be subjected to the action of the reciprocatory brush 58, which will act thereon so as to leave them in a perfectly clean state, as they pass under the grease applicator 65, which in its rotation will effectually and thoroughly grease them, the amount of grease left thereon being regulated by means of the operating bar 77 for the cocks of the grease container.

As the pans pass from under the applicator and under the wiper just above mentioned, when the same is employed, it is obvious that they may be removed for use or permitted to drop into a suitable receptacle for holding them located at the discharging end of the machine. In some instances, it may not be necessary to use the brush 38, as in some classes of cakes or articles being baked, there will be practically no adherence of material to the pans. When such is the case, the clutch pin 100 carried by the pulley 48 may be removed from engagement with the gear 40 when it is manifest that the rotary brush will remain idle.

Ordinarily, the sprocket wheels 28 over which the delivery conveyer members 29 travel will be idly mounted on the shaft 26, but it is apparent that if desired, the delivery conveyer elements 18 can be driven from the shaft 26 by placing the clutch pins 94 carried by the sprocket wheels 20 in engagement with the sprocket wheels 28 of the delivery conveyer.

Having thus fully described my invention, what I claim as new and desire to secure by Letters Patent is—

1. In a machine of the class described, the combination with a supporting frame, of a feeding conveyer mounted thereon for longitudinal movement, means to operate the same, a spring pressed rotatable brush mounted above the conveyer for vertical adjustment, a cleaning element mounted for reciprocating transverse movement above the conveyer, means for rotating said brush, and means connecting said element to the means for imparting rotary movement to the brush for reciprocating said element.

2. In a machine of the class described, the combination with a supporting frame, of a feeding conveyer mounted thereon for longitudinal movement, means to operate the same, a spring pressed rotatable brush mounted above the conveyer for vertical adjustment, a spring pressed grease applicator rotatably mounted above the conveyer for vertical adjustment, and means for simultaneously rotating said brush and said applicator.

3. In a machine of the class described, the combintion with a supporting frame, of a feeding conveyer mounted thereon for longitudinal movement, means to operate the same, a spring pressed rotatable brush mounted above the conveyer for vertical adjustment, a spring pressed grease applicator rotatably mounted above the conveyer for vertical adjustment, means for feeding grease to said applicator, and means for simultaneously rotating said brush and applicator.

4. In a machine of the class described, the combination with a supporting frame, of a feeding conveyer mounted thereon for longitudinal movement, means to operate the same, a spring-pressed rotatable brush mounted above the conveyer for vertical adjustment, a cleaning element mounted for transverse reciprocating movement above the conveyer, a spring-pressed grease applicator rotatably mounted above the conveyer for vertical adjustment, means for feeding grease to said applicator, means for simultaneously rotating said brush and said applicator, and means connecting said cleaning element to the means for imparting rotary movement to the brush and applicator for reciprocating said element.

5. In a machine of the class described, the combination with a supporting frame, of a feeding conveyer mounted thereon for longitudinal movement, means to operate the same, a cleaning element mounted for transverse reciprocating movement above the conveyer, a spring-pressed grease applicator rotatably mounted above the conveyer for vertical adjustment, means for feeding grease to said applicator, means for rotating the same, and means connecting said cleaning element to the means for imparting rotary movement to the applicator for reciprocating said element.

6. In a machine of the class described, the combination with a supporting frame, of a feeding conveyer mounted thereon for longitudinal movement and having means on its outer surface to engage pans, means to operate said conveyer, a spring pressed rotatable brush mounted above the conveyer for vertical adjustment, a spring pressed grease applicator rotatably mounted above the conveyer for vertical adjustment, means for rotating said brush and applicator, a grease container mounted near the applicator and having valve controlled discharging means, a downwardly inclined deflector located below said receptacle and in contact with the applicator, and means to regulate the discharge of grease from said container.

7. In a machine of the class described, the combination with a supporting frame, of a feeding conveyer mounted thereon for longitudinal movement and having means on its outer surface to support and engage pans, means to operate said conveyer, a spring actuated rotatable brush mounted above the conveyer for vertical adjustment, a spring pressed grease applicator rotatably mounted above the conveyer for vertical adjustment, means for rotating said brush and applicator and having valve controlled discharging means, a downwardly inclined deflector located below said receptacle and in contact with the applicator, an absorbing element located on the upper portion of said deflector, and means to regulate the discharge of grease from said container.

8. In a machine of the class described, the combination with a supporting frame, of a feeding conveyer mounted thereon for longitudinal movement, means to operate said conveyer, a spring pressed rotatable brush mounted above the conveyer for vertical adjustment, a fixed brush transversely mounted above the conveyer near the rotary brush, a spring pressed grease applicator rotatably mounted above the conveyer for vertical adjustment, means for rotating said brush and applicator, a grease container mounted near the applicator and having means for the outlet of grease, a downwardly inclined deflector located below said receptacle and in contact with the applicator, and means to regulate the discharge of grease from said container.

9. In a machine of the class described, the combination with a supporting frame, of a feeding conveyer mounted thereon for longitudinal movement, means to operate said conveyer, a spring pressed rotatable brush mounted above the conveyer for vertical adjustment, a fixed brush transversely and horizontally mounted above the conveyer near the rotary brush, a shield vertically supported between the rotary brush and said fixed brush, means for rotating said brush, a cleaning element mounted for transverse reciprocating movement above the conveyer, and means connecting said element to the means for imparting rotary movement to the brush for reciprocating said element.

10. In a machine of the class described, the combination with a supporting frame, of a feeding conveyer mounted thereon for longitudinal movement, means to operate the same, a spring pressed rotary grease applicator rotatably mounted above the conveyer for vertical adjustment, means for feeding grease to said applicator, said applicator consisting of a cylindrical drum having longitudinally disposed spaced grooves in its periphery, a flexible cover surrounding said groove, clamping bars located in said grooves for the purpose of holding portions of said cover thereon, absorbent pads located between the periphery of the drum and the portions of the cover disposed between said grooves, and means to rotate said applicators.

WILLIAM H. PUHL.